Oct. 12, 1954 J. N. SHIVE 2,691,750

SEMICONDUCTOR AMPLIFIER

Filed Aug. 14, 1948

INVENTOR
J. N. SHIVE
BY [signature]
ATTORNEY

Patented Oct. 12, 1954

2,691,750

UNITED STATES PATENT OFFICE 2,691,750

SEMICONDUCTOR AMPLIFIER

John N. Shive, Plainfield, N. J., assignor to Bell Telephone Laboratories, Incorporated, New York, N. Y., a corporation of New York Application August 14, 1948, Serial No. 44,241

24 Claims. (Cl. 317—235)

This invention relates to means for and methods of translating or controlling electrical signals, and more particularly to circuit elements utilizing semiconductors and to systems including such elements.

One general object of this invention is to provide new and improved means for and methods of translating and controlling, for example, amplifying, generating, and modulating, electric signals.

Another general object of this invention is to enable the efficient, expeditious, and economic translation or control of electrical energy.

A further object of this invention is to improve the mechanical and operating stability of electrical translating devices of the type including a body of semiconductive material.

Still another object of this invention is to facilitate the realization of reproducible operating characteristics for such translating devices.

A still further object of this invention is to simplify and expedite the manufacture of such devices.

In accordance with one broad feature of this invention, translation and control of electrical signals is effected by alteration or regulation of the conduction characteristics of a semiconductive body. More specifically, in accordance with one broad feature of this invention, such translation and control is effected by control of the characteristics, for example the impedance, of a layer or barrier intermediate two portions of a semiconductive body in such a manner as to alter advantageously the flow of current between the two portions.

A further feature of this invention relates to a body of semiconductive material, means for making electrical connection respectively to two portions of said body on opposite sides thereof, means for making a third electrical connection to another portion of the body intermediate said portions, and circuit means, including power sources, whereby the influence of the third connection may be made to control the flow of current between the other connections.

Another feature of this invention involves a semiconductive body which may be used for voltage and power amplification when associated with means for introducing current into the body at relatively low voltage from a contact electrode called the emitter and for extracting current from the body at relatively high voltage by means of another contact electrode called the collector.

A further feature of this invention resides in structure for mounting a semiconductive body between two point contacts whereby substantially colinear contact is made to opposite faces of the body and an enantiomorphic structure is provided, i. e., one-half of the structure is a mirror image of the other.

Another feature of this invention involves a translating device comprising a conductive body and means for making connection to spaced portions thereof, wherein the structural relations of the body and connections may be arranged to produce self-oscillation without further provision of output to input connection for that purpose.

The foregoing and other objects and features of this invention will appear more fully and clearly from the following description of illustrative embodiments thereof taken in connection with the appended drawings in which.

Figure 1:
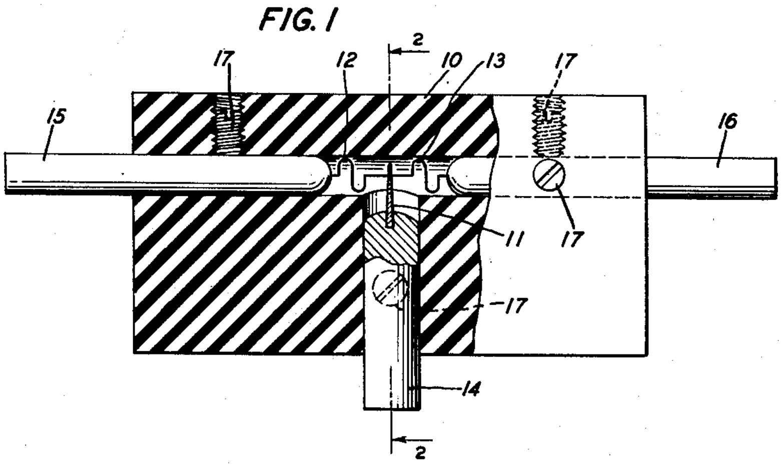
Fig. 1 is a longitudinal section of a translating device illustrative of one embodiment of the invention.

Translating devices as contemplated by this invention comprise a body of semiconductive material to which three or more separated connections are made. In a particular example, such as those illustrated, the body is a slab or wedge to which two connections are made respectively at substantially opposite points on opposed faces and the third connection is made at an edge or base. If current is introduced at one opposed connection (the emitter) through a low impedance by applying a relatively low voltage between the emitter and the third or base connection, and is extracted at the other opposed connection (the collector) through a high impedance by applying a relatively high voltage between the collector and the base, amplification of power is obtained.

In devices of this type there appears to exist at both the emitter and the collector connection a barrier or high impedance condition which allows current flow with relative ease in one direction and with relative difficulty in the other. According to one hypothesis, a barrier exists between the main body of semiconductive material and a zone of material of opposite conductivity type surrounding the emitter or collector connection. This material would be of P-type, for example, if the main body were of N-type. This change in conductivity type might be due to a change in significant impurities by an exchange of material between the contact point and the body during current flow therethrough. Whatever the reason for the existence of this barrier at the emitter and collector connections, its existence is consistent with the facts of operation of devices of this type.

The current which is introduced at the emitter goes in the direction of easy flow across the barrier at the emitter because of a voltage drop in the right direction across this barrier. For an N-type body the emitter bias is ordinarily positive to produce this result, but may in some cases be slightly negative if an internal voltage drop, i. e., from the emitter-collector region to the base, is such that the voltage drop across the emitter barrier is still in the direction of easy flow of current. The collector voltage is applied in the direction of difficult flow of current, so it will be relatively high in order to pass a current comparable to that introduced at the emitter.

Devices of the general type described are disclosed in Patent 2,569,347 to William Shockley, issued September 25, 1951 on an application Serial No. 35,423 filed June 26, 1948 and theories of operation of such devices are more fully explained therein.

Semiconductive materials which have been found suitable for utilization in devices of this invention include germanium and silicon containing minute quantities of significant impurities which comprise one way of determining the conductivity type (either N or P-type) of the semiconductive material. The conductivity type may also be determined by energy relations within the semiconductor. For a more detailed explanation reference is made to Patent 2,524,035 granted October 3, 1950 to J. Bardeen and W. H. Brattain Serial No. 33,466 filed June 17, 1948.

The terms N-type and P-type are applied to semiconductive materials which tend to pass current easily when the material is respectively negative or positive with respect to a conductive contact thereto and with difficulty when the reverse is true, and which also have consistent Hall and thermoelectric effects.

The expression "significant impurities" is here used to denote those impurities which affect the electrical characteristics of the material such as its resistivity, photosensitivity, rectification, and the like, as distinguished from other impurities which have no apparent effect on these characteristics. The term "impurities" is intended to include intentionally added constituents as well as any which may be included in the basic material as found in nature or as commercially available. Germanium and silicon are such basic material which, along with some representative impurities, will be noted in describing illustrative examples of the present invention. Lattice defects such as vacant lattice sites and interstitial atoms when effective in producing mobile charge carriers are to be included in "significant impurities."

Small amounts of impurities such as phosphorous in silicon, and antimony and arsenic in germanium, are termed "donor" impurities because they contribute to the conductivity of the basic material by donating electrons to an unfilled "conduction" energy band in the basic material. The donated negative electrons in such a case constitute the carriers of current and the material and its conductivity are said to be of the N-type. This is also known as conduction by the excess process. Small amounts of other impurities, for example boron in silicon and aluminum in germanium, are termed "acceptor" impurities because they contribute to the conductivity by "accepting" electrons from the atoms of the basic material in the "filled band." Such an acceptance leaves gaps or "holes" in the "filled band." By interchange of the remaining electrons in the "filled band," these positive "holes" effectively move about and constitute the carriers of current, and the material and its conductivity are said to be of the P-type. The term defect process may also be applied to this type of conduction. A further discussion of semiconductors of the type indicated may be found in the literature, for example "Crystal Rectifiers" by H. C. Torrey and C. A. Whitmer, volume 15, of the M. I. T. Radiation Laboratory Series.

Methods of preparing silicon of either conductivity type or a body of silicon including both types are known. Such methods are disclosed in Patent 2,567,970 to J. H. Scaff and H. C. Theuerer issued September 18, 1951 on an application filed December 24, 1947, Serial No. 793,744 and United States Patents 2,402,661 and 2,402,662 to R. S. Ohl. Such materials are suitable for use in connection with the present invention. Germanium material may also be made in either conductivity type or in bodies containing both types and it may be so treated as to enable it to withstand high voltages in the reverse direction from the rectification viewpoint. This material may be prepared in accordance with the process disclosed in Patent 2,602,211 to J. H. Scaff and H. C. Theuerer issued June 8, 1952 on an application filed December 29, 1945, Serial No. 638,351.

The term "barrier" or "electrical barrier" used in the description and discussion of devices in accordance with this invention is applied to a high resistance interfacial condition between contacting semiconductors of respectively opposite conductivity type or between a semiconductor and a metallic conductor whereby current passes with relative ease in one direction and with relative difficulty in the other.

Figure 2:
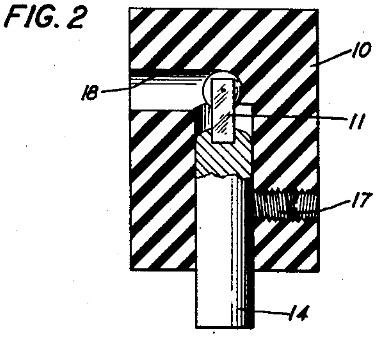
Fig. 2 is a section taken on the line 2—2 of Fig. 1.

Referring to Figs. 1 and 2, 10 is a block of insulating material, such as one of the plastic or ceramic insulating materials, in which are mounted a semiconductive body 11 and contacting members 12 and 13. The member 11 may be mounted on a stud or rod 14 and the contacts 12 and 13 on studs or rods 15 and 16, respectively.

The rod 14 is push fit in a lateral bore in the block 10. Rods 15 and 16 are also push fits in a longitudinal bore through said block. Each of the rods may be held in place when properly positioned by a set-screw 17.

The semiconductive body 11 may be in the shape of a wedge as shown or may be a relatively thin plate or slab with no taper. This body may be secured on the end of rod 14 in any suitable manner. One way of doing this is to coat the base of the body 11 with a metallic film such as electroplated copper, and then solder it into a slot in the rod 14.

The contact elements 12 and 13 may be S-type spring contacts such as are used in crystal rectifiers. A suitable material for these contacts is Phosphor bronze. These contact springs may be soldered into holes in the ends of rods 15 and 16, respectively. The rods 14, 15 and 16 may be made of nickel or other suitable metal.

The device shown in Figs. 1 and 2 may be assembled by pushing rods 15 and 16 into the block until the contact points almost meet. The contact points may be adjusted to position by way of the orifice 18. The rod 14 is then inserted in its orifice until the body 11 is in suitable position between the contacts 12 and 13 and the rod 14 is then secured in place by the set-screw associated with it. The rods 15 and 16 may then each be advanced sufficiently to make suitable contact to opposite sides of the body 11. In order to determine that a suitable contact is made to the semiconductor by each contact point, an oscilloscope or other suitable indicating device is connected to the device and an alternating voltage applied between each contact and the body. One rod is advanced until a rectifier characteristic is indicated showing that contact has been made. The rod is then advanced slightly further to insure sufficient spring pressure to maintain the contact. In devices which have been herein specifically described the additional advancement is about .003 inch. The other point is then similarly adjusted. When a satisfactory adjustment has been made, the rods 15 and 16 are clamped in place by means of their set-screws.

Figure 3:
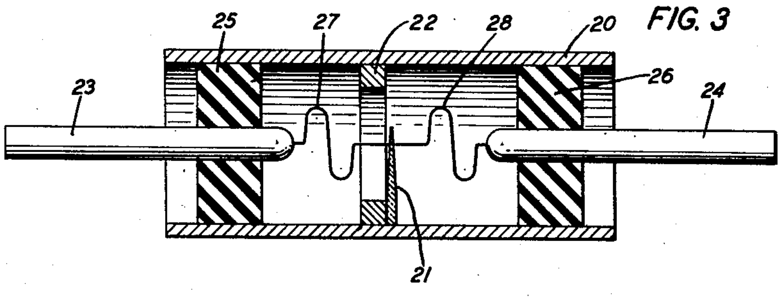
Fig. 3 is a longitudinal section of another embodiment of the invention.

The device shown in Fig. 3 comprises a metallic cylinder 20 which may be of nickel-plated brass or other suitable conductive material. The semiconductive body 21, which may be similar to the body 11 shown in Fig. 1, may be secured as by means of a metallic coating and solder to a metal ring 22. The ring 22, which may be of brass, is fitted centrally in the cylinder 20. The contact supporting rods 23 and 24 are secured respectively in cylindrical blocks of insulation 25 and 26. The rods 23 and 24 may be of nickel and the cylindrical blocks 25 and 26 of a ceramic material. Contacts 27 and 28, which may be similar to the contact springs 12 and 13 of Fig. 1 may be secured to the rods 23 and 24 as by soldering into axial openings in the ends of these rods.

This device may be assembled by pushing the ring 22 and semiconductor 21 into the cylinder 20 to a substantially central position. The blocks 25 and 26 are then fitted into respective ends of the cylinder and advanced until contact is made to opposite sides of the body 21 by the contact springs 27 and 28. This manipulation may be observed and some adjustments may be made through an orifice similar to 18 of Fig. 1 and a test circuit with suitable indicating means may also be employed to indicate when suitable adjustment has been made.

The tapered bodies of semiconductive material such as 11 and 21 of Figs. 1 and 3 respectively or an untapered slab of the semiconductive material may be prepared for use by the following procedure: A piece of semiconductive material, for example germanium cut from an ingot made in accordance with the beforenoted processes may be wet ground to shape on a lap such as a glass lap with a suitable grit of about the size passing a 280-mesh screen and finished with a 600-mesh grit. After this slab or wedge is shaped, it may be etched in a solution comprising 10 cubic centimeters of concentrated nitric acid, 5 cubic centimeters of concentrated hydrofluoric acid and 10 cubic centimeters of a solution containing 200 milligrams of copper nitrate. The etching time may range from 30 seconds to 10 minutes. The etched body may be rinsed with water followed by a flushing with alcohol with subsequent air drying.

After the unit has been physically assembled but before it is put into use it may be given an electrical forming treatment similar to that described in the aforenoted patent of John Bardeen and Walter H. Brattain. This treatment may comprise applying an alternating current voltage to the collector connection through a load resistance approximately matching the collector resistance of the unit being processed, until the collector characteristic as indicated by suitable indicating means (a cathode ray oscilloscope) suddenly changes from its initial indication to one corresponding to a greatly improved power gain. The alternating current forming voltage may be supplied by a variable alternating current source replacing the collector battery of Fig. 4, for example.

In a specific device, the germanium body or slab 11 or 21 may have a height of 0.04 inch, a width of 0.04 inch and a thickness at the base of 0.01 inch, and the thickness of the body between the contact points 12 and 13 may be 0.003 inch. The material may be high back voltage germanium containing a trace of donor impurity such as arsenic.

Figure 4:
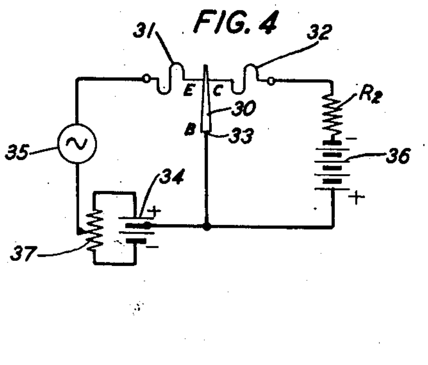
Fig. 4 is a circuit diagram illustrating one manner in which the devices shown in Figs. 1, 2 and 3 may be utilized.

One mode of operation of these devices may be considered with respect to Fig. 4 in which the body 30 is of N-type semiconductive material. The emitter and collector connections 31 and 32, respectively, make contact on opposite sides of the body 30 and a third connection is made at the base 33. These connections have been labeled E, C, and B to represent the emitter, collector and base, respectively, in Fig. 4 as an aid in the understanding of the illustration. A biasing source, such as battery 34, applies a small normally positive bias of the order of 0.1 to 1.0 volt, to the emitter and a signal is also applied to the emitter from the signal source 35. The battery 34 may have a center tap to the base electrode 32 and may be provided with a potentiometer 37 for supplying the low voltage to the emitter either positive or negative with respect to the base electrode 33. A relatively high negative bias of the order of 10 to 100 volts from the battery 36 is applied to the collector through a load represented by the resistor $R_L$. The positive side of the battery 36 is also connected to the base electrode 33. Since the current is injected at a relatively low voltage and extracted at a relatively high voltage, a gain in power is obtained.

With a germanium element having a thickness of about 3 mils between point electrodes, which were made from Phosphor bronze wires of about .005 inch diameter, power gains of up to one hundred times have been obtained at frequencies up to about 10 megacycles.

Devices of the construction illustrated and described may be utilized also as oscillators. It has been found that if the resistance along the semiconductive body between the base connection at B and the other connections is of proper value, positive feedback occurs between the input and output circuits and oscillations can be generated without the provision of other intercoupling means. The feedback obtains by virtue of the resistance of the current path through the body between the base and the region between the point contacts. This resistance is common to the input and output circuits and constitutes a coupling impedance therebetween. These circuits, of course, have reactance due in part to the connections between the semi-conductive body and the point contacts. In devices of the construction described and having dimensions of the order of magnitude heretofore given, resistances of the order of 100 to 1,000 ohms from the base to the region between the contact points have been found satisfactory to result in oscillation. In general, reducing this resistance, as by reducing the resistance of the contact to the base or by increasing the wedge thickness, decreases the tendency to oscillate.

The foregoing description of various modifications of this invention is for the purpose of illustration only and is not intended to be taken as limiting the invention.

What is claimed is:

1. A translating device comprising a thin slab of semiconductive material of one conductivity type, means for making rectifying contact respectively to substantially opposite points on opposed faces of said slab, and means for making electrical connection to another part of said slab.

2. A circuit element comprising a conductive tube, a body of semiconductive material secured within the tube intermediate its ends and electrically connected thereto, insulating means supported by the tube on opposite sides of the body, and connecting means supported respectively by the insulating means and in substantially colinear rectifying contact to opposite faces of said body.

3. A circuit element comprising a housing, a body of semiconductive material mounted within and centrally of said housing, said body having a thick and a thin portion, means including elements secured to said housing for making rectifying contact respectively to opposite faces of the thin portion of the body, and other means for making contact to the thick portion of the body.

4. A circuit element comprising a body of insulation having a longitudinal through orifice and a lateral orifice intersecting the through orifice intermediate its ends, a semiconductive body, a conductive stud secured in the lateral orifice and mounting the semiconductive body in the longitudinal orifice, and other conductive studs secured in the longitudinal orifice on opposite sides of the body, each stud maintaining a connecting element in rectifying contact respectively with an opposite face of the body.

5. A circuit element comprising a conductive housing open at opposite ends, a body of semiconductive material secured within and in electrical connection with the housing, and connecting means supported in the housing and making connection to substantially opposite points on the body respectively.

6. An amplifier comprising a wafer of N-type semiconductor, an emitter connection and a collector connection respectively to substantially opposite points on opposed faces of the wafer, and a base connection to an edge of the wafer intermediate said opposed faces.

7. An amplifier comprising a slab of N-type, high back voltage germanium, an emitter connection and a collector connection respectively to substantially opposite points on opposed faces of the slab, and a base connection to an edge of the slab between said faces.

8. An electrical translating device comprising a body of germanium of one conductivity type and having a thin portion and a thick portion, rectifying connections to substantially aligned points on opposite faces of said thin portion, and means for impressing a potential between one of said contact means and said thick portion.

9. An electrical translating device comprising a body of semiconductive material having a base and a portion remote from said base and of less thickness than said base, substantially aligned contacts engaging opposite faces of said portion and defining rectifying junctions therewith, and contact means engaging said base.

10. An electrical translating device comprising a wedge-shaped body of germanium, a pair of aligned point contacts engaging opposite faces of said body adjacent the apex thereof, and contact means engaging said body adjacent the base thereof.

11. An electrical amplifier comprising a body of germanium having a thin portion and a thick portion, a pair of rectifying connections to substantially aligned points on opposite faces of said thin portion, and a substantially ohmic connection to said thick portion.

12. An electrical amplifier comprising a body of germanium of one conductivity type and having a wedge-shaped portion, contact points making rectifying junction with substantially aligned points on opposite faces of said portion near the apex thereof, and a connection to a region of said portion remote from the apex thereof.

13. An electrical translating device comprising a body of germanium having a first portion of the order of 3 mils in thickness and a second portion remote from said first portion and of substantially greater thickness, a pair of contacts engaging opposite faces of said first portion and defining rectifying junctions therewith, and a connection to said second portion.

14. An electrical translating device comprising a body of germanium having a wedge-shaped portion the thickness of which adjacent the apex is of the order of 3 mils, a pair of point contacts engaging opposite faces of said body adjacent said apex, and a contact engaging said body adjacent the base of said wedge-shaped portion.

15. An electrical translating device comprising a body of semiconductive material having a thin portion, a pair of point contacts engaging opposite faces of said thin portion at points aligned in the direction of the thickness of said portion, and means for impressing an electric field upon said body in the direction substantially normal to the line between said points.

16. An electrical translating device comprising a body of germanium having a wedge-shaped portion, a pair of contacts in rectifying junction with substantially aligned points on opposite faces of said portion adjacent the apex thereof, and means for impressing upon said body an electric field substantially normal to the line between said points.

17. A signal translating device comprising a body of semiconductive material of one conductivity type, emitter and collector connections to substantially opposite points on opposed faces of said body, and a base connection to an edge of said body intermediate said faces.

18. A semiconductor unit comprising a wedge-shaped semiconductor crystal having two sides meeting in an apex line, two catwhisker contacts, one to each side of said wedge near the apex line, and an additional contact of relatively large area engaging said crystal in a region remote from said catwhisker contacts.

19. A semiconductor unit comprising a wedge-shaped crystal having two sides meeting in an apex line, two catwhisker contacts, one to each side of said wedge near the apex line, and a contact of larger area than said catwhisker contacts on the base of said wedge.

20. A semiconductor unit comprising a body of semiconductive material having two surfaces converging to an apex line, a contact of relatively large area engaging said body, and two point-contact elements engaging said body on opposite surfaces near the apex line, said point-contact elements being situated remotely with respect to the contact of relatively large area.

21. A semiconductor unit including a body of semiconductive material having a contact of large area and two point-contact elements engaging said body at mutually separated points, each of said point-contact elements exerting an influence on said body for a limited distance from the contact point and being sufficiently close to each other to exert that influence on a common portion of said body, said body being engaged by said elements on opposite sides.

22. A semiconductor unit including a body of semiconductive material having a large-area contact and two point-contact elements engaging said body at mutually separated places, said elements engaging said body at places sufficiently close together to affect the same portion of said material, said body having thick and thin portions, said large-area contact engaging said thick portion and said point-contact elements engaging opposite sides of said thin portion and embodying terminals extending in substantially opposite directions.

23. A semiconductor unit including a body of semiconductive material having a contact of large area and two point-contact elements engaging said body at mutually separated points, the engagement of the large-area contact being relatively remote from the point-contact elements, the point-contact elements engaging said body at points sufficiently close to each other to affect a common portion of said body, said body being thin at the place where it is engaged by those point-contact elements and said elements engaging said body on opposite sides and extending in substantially opposite directions from said thin place, an envelope connected to said large-area contact and extended to include hollow portions about said point-contact elements, and plugs within said hollow portions maintaining said point-contact elements in place.

24. A circuit element comprising a body of semiconductive material having a thick and a thin portion, point-contact elements respectively engaging opposite faces of the thin portion of the body, and other means for making contact to the thick portion of the body.

References Cited in the file of this patent

UNITED STATES PATENTS

| Number | Name | Date |
|---|---|---|
| 1,877,140 | Lilienfeld | Sept. 13, 1932 |
| 1,919,053 | Brinton | July 18, 1933 |
| 1,949,383 | Weber | Feb. 27, 1934 |
| 2,367,943 | Hein | Jan. 23, 1945 |
| 2,438,893 | Bieling | Apr. 6, 1948 |
| 2,454,846 | Skinker | Nov. 30, 1948 |
| 2,476,323 | Rack | July 19, 1949 |
| 2,486,776 | Barney | Nov. 1, 1949 |
| 2,516,344 | Ross et al. | July 25, 1950 |
| 2,517,960 | Barney | Aug. 8, 1950 |
| 2,524,033 | Bardeen | Oct. 3, 1950 |
| 2,524,034 | Brattain | Oct. 3, 1950 |
| 2,524,035 | Bardeen | Oct. 3, 1950 |
| 2,552,052 | Matare | May 8, 1951 |

FOREIGN PATENTS

| Number | Country | Date |
|---|---|---|
| 439,457 | Great Britain | Dec. 6, 1935 |

OTHER REFERENCES

Bardeen et al., article entitled "The Transistor, A Semiconductor Triode" in the Physical Review of July 15, 1948, pages 230, 233.